United States Patent
Zhang

(10) Patent No.: US 10,009,808 B2
(45) Date of Patent: Jun. 26, 2018

(54) CELL SELECTION METHOD AND APPARATUS

(71) Applicant: HUAWEI TECHNOLOGIES CO., LTD., Shenzhen, Guangdong (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/547,301

(22) PCT Filed: Jan. 29, 2015

(86) PCT No.: PCT/CN2015/071841
§ 371 (c)(1),
(2) Date: Jul. 28, 2017

(87) PCT Pub. No.: WO2016/119177
PCT Pub. Date: Aug. 4, 2016

(65) Prior Publication Data
US 2018/0027460 A1    Jan. 25, 2018

(51) Int. Cl.
*H04W 36/00* (2009.01)
*H04W 36/20* (2009.01)
*H04W 48/20* (2009.01)

(52) U.S. Cl.
CPC ....... *H04W 36/0083* (2013.01); *H04W 36/20* (2013.01); *H04W 48/20* (2013.01)

(58) Field of Classification Search
CPC .............................. H04W 36/0083

USPC ........................................................ 455/437
See application file for complete search history.

(56) References Cited

U.S. PATENT DOCUMENTS

| | | |
|---|---|---|
| 2013/0215785 A1 | 8/2013 | Jung et al. |
| 2013/0215787 A1 | 8/2013 | Jeong et al. |
| 2015/0023283 A1 | 1/2015 | Liu et al. |
| 2015/0373601 A1 | 12/2015 | Benjebbour et al. |

FOREIGN PATENT DOCUMENTS

| | | |
|---|---|---|
| CN | 101931993 A | 12/2010 |
| CN | 103327550 A | 9/2013 |
| CN | 104170453 A | 11/2014 |
| EP | 2806694 A1 | 11/2014 |
| WO | 2014/125885 A1 | 8/2014 |

OTHER PUBLICATIONS

International Search Report dated Aug. 3, 2015 in corresponding International Application PCT/CN2015/071841, filed Jan. 29, 2017.
Extended European Search Report dated Nov. 7, 2017 in corresponding European Patent Application No. 15879385.1.
(Continued)

*Primary Examiner* — Joel Ajayi
(74) *Attorney, Agent, or Firm* — Staas & Halsey LLP

(57) ABSTRACT

A cell selection method and an apparatus are provided. The method includes: performing, by a terminal, cell measurement; obtaining, by the terminal, cell selection auxiliary information; and performing, by the terminal, cell selection or cell reselection according to a cell measurement result and the cell selection auxiliary information. By using the method, the terminal can select a more suitable cell.

20 Claims, 2 Drawing Sheets

(56) References Cited

OTHER PUBLICATIONS

"$3^{rd}$ Generation Partnership Project; Technical Specification Group Radio Access Network; Evolved Universal Terrestrial Radio Access (E-UTRA); User Equipment (EU) procedures in idle mode (Release 12)," 3GPP, 3rd Generation Partnership Project, 3GPP TS 36.304, V12.3.0, Dec. 2014.

International Search Report dated Aug. 3, 2015 in corresponding International Patent Application No. PCT/CN2015/071841.

US 10,009,808 B2

CELL SELECTION METHOD AND APPARATUS

CROSS-REFERENCE TO RELATED APPLICATION

This application is a U.S. National Stage Application, which claims benefit under 35 U.S.C § 371, of International Patent Application No. PCT/CN2015/071841 filed Jan. 29, 2015, the entire disclosure of which is incorporated herein by reference.

TECHNICAL FIELD

The present invention relates to the field of communications technologies, and in particular, to a cell selection method and an apparatus.

BACKGROUND

A terminal in an idle mode needs to constantly perform cell reselection, so as to camp on a cell with a higher priority or better channel quality.

In the idle mode, the terminal triggers the cell reselection by monitoring measurement values of a serving cell and a neighboring cell. Core content of a cell reselection criterion is: If there is a cell whose channel quality is better than that of a serving cell, and the cell with the better channel quality keeps the better channel quality within a period of time, the terminal reselects the cell with the better channel quality.

In an LTE (English: Long Term Evolution, Chinese: Long Term Evolution) system, different types of cells coexist and form a heterogeneous network. The heterogeneous network includes cells with different sizes of coverage areas and different types of cells, for example, may include a macro cell (English: macro cell), a micro cell (English: micro cell), a pico cell (English: pico cell), a femto cell (English: femto cell), and the like. A coverage area of a macro cell may include a micro cell, a pico cell, a femto cell, or the like.

Currently, a network system architecture is increasingly complex, and performing cell reselection according only to the current cell reselection criterion is inapplicable to this increasingly complex network system architecture. Therefore, a corresponding solution is urgently needed, so that the terminal reselects a cell as suitable as possible.

SUMMARY

Embodiments of the present invention provide a cell selection method and an apparatus, to indicate cell selection auxiliary information to a terminal by using a base station, so that the terminal performs cell selection on the basis of the cell selection auxiliary information.

According to a first aspect, a cell selection method is provided, including:

performing, by the terminal, cell measurement;

obtaining, by the terminal, cell selection auxiliary information; and performing, by the terminal, cell selection or cell reselection according to a cell measurement result and the cell selection auxiliary information.

With reference to the first aspect, in a first possible implementation of the first aspect, the performing, by the terminal, cell selection or cell reselection according to a cell measurement result and the cell selection auxiliary information includes:

determining, by the terminal, a candidate target set for the cell selection or reselection according to the cell measurement result, where the candidate target set includes a candidate target cell or a candidate target base station; and selecting, by the terminal, a cell from the candidate target set according to the cell selection auxiliary information.

With reference to the first aspect, in a second possible implementation of the first aspect, the cell selection auxiliary information includes one type or any combination of the following content:

if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and if the terminal has the CRS interference suppression capability or interference cancellation capability, the carrier that is configured to be used to avoid interference to a neighboring cell is used as a low-priority cell selection or reselection target or a non-preferred resident carrier.

With reference to the second possible implementation of the first aspect, in a third possible implementation of the first aspect, the selecting, by the terminal, a cell from the candidate target set according to the cell selection auxiliary information includes:

if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, using the first carrier, configured on the interfered base station, as a high-priority cell selection or reselection target or a preferred resident carrier; or if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, using the carrier, configured by the interfered base station, as a high-priority cell selection or reselection target or a preferred resident carrier; or if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, using the first carrier, configured on the interfered base station, as a low-priority cell selection or reselection target or a non-preferred resident carrier; or if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, using the carrier, configured by the interfered base station, as a low-priority cell selection or reselection target or a non-preferred resident carrier.

With reference to any one of the first aspect or the first to the third possible implementations of the first aspect, in a fourth possible implementation of the first aspect, the method further includes:

if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, using a second carrier, configured by the interfered base station, as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, using a second carrier, configured by the interfered base station, as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

With reference to any one the first aspect or the first to the fourth possible implementations of the first aspect, in a fifth possible implementation of the first aspect, the cell selection auxiliary information includes one type or a combination of the following information:

carrier configuration characteristic information;

a carrier with a specified characteristic; and resident carrier preference information of the terminal.

With reference to the fifth possible implementation of the first aspect, in a sixth possible implementation of the first aspect, the carrier configuration characteristic information includes:

a carrier identifier and indication information corresponding to the carrier identifier, where the indication information is used to indicate whether a corresponding carrier is configured as a carrier used to avoid interference to a neighboring cell.

With reference to the fifth possible implementation of the first aspect, in a seventh possible implementation of the first aspect, the carrier with a specified characteristic includes:

a carrier that is configured to be used to avoid interference to a neighboring cell, and/or a carrier with a characteristic of representing a specific capability.

With reference to the fifth possible implementation of the first aspect, in an eighth possible implementation of the first aspect, the resident carrier preference information of the terminal includes:

an identifier of a carrier that is configured to be used to avoid interference to a neighboring cell and a list of a first terminal type and/or a list of a second terminal type that are/is corresponding to the identifier of the carrier, where a terminal indicated by the first terminal type has no CRS interference suppression capability or interference cancellation capability, and uses a carrier that is configured to be used to avoid interference to a neighboring cell as a high-priority cell selection or reselection target; and a terminal indicated by the second terminal type has the CRS interference suppression capability or interference cancellation capability, and uses a carrier that is configured to be used to avoid interference to a neighboring cell as a low-priority cell selection or reselection target.

With reference to any one of the second to the eight possible implementations of the first aspect, in a ninth possible implementation of the first aspect, the carrier used to avoid interference to a neighboring cell includes an extension carrier or a new carrier type or a segmentation carrier.

With reference to any one of the first aspect or the first to the fourth possible implementations of the first aspect, in a tenth possible implementation of the first aspect, the obtaining, by the terminal, cell selection auxiliary information includes:

receiving, by the terminal, the cell selection auxiliary information from a base station.

With reference to the tenth possible implementation of the first aspect, in an eleventh possible implementation of the first aspect, the receiving, by the terminal, the cell selection auxiliary information from a base station includes:

receiving, by the terminal, the cell selection auxiliary information from the base station by using a broadcast message or dedicated signaling.

With reference to the eleventh possible implementation of the first aspect, in a twelfth possible implementation of the first aspect, the dedicated signaling is RRC connection release signaling.

With reference to the tenth possible implementation of the first aspect, in a thirteenth possible implementation of the first aspect, the cell selection auxiliary information is determined by the base station according to a carrier configuration characteristic of the base station, where the base station is an interfering base station; or the cell selection auxiliary information is determined by an interfering base station according to a carrier configuration characteristic of the interfering base station, and then is sent to the base station, where the base station is an interfered base station.

According to a second aspect, a terminal is provided, including:

a measurement module, configured to perform cell measurement;

an obtaining module, configured to obtain cell selection auxiliary information; and a cell selection module, configured to perform cell selection or cell reselection according to a cell measurement result and the cell selection auxiliary information.

With reference to the second aspect, in a first possible implementation of the second aspect, the cell selection module is specifically configured to:

determine a candidate target set for the cell selection or reselection according to the cell measurement result, where the candidate target set includes a candidate target cell or a candidate target base station; and select a cell from the candidate target set according to the cell selection auxiliary information.

With reference to the second aspect, in a second possible implementation of the second aspect, the cell selection auxiliary information includes one type or any combination of the following content:

if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and if the terminal has the CRS interference suppression capability or interference cancellation capability, the carrier that is configured to be used to avoid interference to a neighboring cell is used as a low-priority cell selection or reselection target or a non-preferred resident carrier.

With reference to the second possible implementation of the second aspect, in a third possible implementation of the second aspect, the cell selection module is specifically configured to:

if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a high-priority cell selection or reselection target or a preferred resident carrier; or if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a high-priority cell selection or reselection target or a preferred resident carrier; or if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a low-priority cell selection or reselection target or a non-preferred resident carrier; or if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a low-priority cell selection or reselection target or a non-preferred resident carrier.

With reference to any one of the second aspect or the first to the third possible implementations of the second aspect, in a fourth possible implementation of the second aspect, the cell selection module is further configured to:

if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

With reference to any one the second aspect or the first to the fourth possible implementations of the second aspect, in a fifth possible implementation of the second aspect, the cell selection auxiliary information includes one type or a combination of the following information:

carrier configuration characteristic information;

a carrier with a specified characteristic; and resident carrier preference information of the terminal.

With reference to any one of the second aspect or the first to the fifth possible implementations of the second aspect, in a sixth possible implementation of the second aspect, the obtaining module is specifically configured to receive the cell selection auxiliary information from a base station by using a broadcast message or dedicated signaling.

According to a third aspect, a terminal is provided, including a processor, a memory, a transceiver, and a bus interface, where the processor, the memory, and the transceiver are connected by using the bus interface, the memory stores data used when the processor performs an operation, the transceiver is configured to receive and transmit data under control of the processor, and the processor is configured to read a program in the memory, to execute the following process:
    performing cell measurement;
    obtaining cell selection auxiliary information; and
    performing cell selection or cell reselection according to a cell measurement result and the cell selection auxiliary information.

With reference to the third aspect, in a first possible implementation of the third aspect, the processor is specifically configured to:
    determine a candidate target set for the cell selection or reselection according to the cell measurement result, where the candidate target set includes a candidate target cell or a candidate target base station; and
    select a cell from the candidate target set according to the cell selection auxiliary information.

With reference to the third aspect, in a second possible implementation of the third aspect, the cell selection auxiliary information includes one type or any combination of the following content:
    if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and
    if the terminal has the CRS interference suppression capability or interference cancellation capability, the carrier that is configured to be used to avoid interference to a neighboring cell is used as a low-priority cell selection or reselection target or a non-preferred resident carrier.

With reference to the second possible implementation of the third aspect, in a third possible implementation of the third aspect, the processor is specifically configured to:
    if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a high-priority cell selection or reselection target or a preferred resident carrier; or
    if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a high-priority cell selection or reselection target or a preferred resident carrier; or
    if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a low-priority cell selection or reselection target or a non-preferred resident carrier; or
    if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a low-priority cell selection or reselection target or a non-preferred resident carrier.

With reference to any one of the third aspect or the first to the third possible implementations of the third aspect, in a fourth possible implementation of the third aspect, the processor is further configured to:
    if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or
    if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

With reference to any one the third aspect or the first to the fourth possible implementations of the third aspect, in a fifth possible implementation of the third aspect, the cell selection auxiliary information includes one type or a combination of the following information:
    carrier configuration characteristic information;
    a carrier with a specified characteristic; and
    resident carrier preference information of the terminal.

With reference to any one of the third aspect or the first to the fifth possible implementations of the third aspect, in a sixth possible implementation of the third aspect, the processor is specifically configured to receive the cell selection auxiliary information from a base station by using a broadcast message or dedicated signaling that is received by the transmitter.

In the foregoing embodiments of the present invention, a terminal performs cell selection or cell reselection according to cell selection auxiliary information, so that the terminal can perform the cell selection or the cell reselection with reference to the cell selection auxiliary information. Compared with the prior art in which cell reselection is performed according only to a cell reselection criterion, in the present invention, the terminal can select a more suitable cell.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunication System, UMTS), and a Worldwide Interoperability for Microwave Access (Worldwide Interoperability for Microwave Access, WiMAX) communications system.

It should be understood that in the embodiments of the present invention, user equipment (English full name: User Equipment, UE for short) includes but is not limited to a mobile station (English full name: Mobile Station, MS for short), a mobile terminal (Mobile Terminal), a mobile telephone (Mobile Telephone), a handset (handset), portable equipment (portable equipment), and the like. The user equipment may communicate with one or more core networks by using a radio access network (English full name: Radio Access Network, RAN for short). For example, the user equipment may be a mobile telephone (or referred to as a "cellular" phone), or a computer having a wireless communication function; the user equipment may further be a portable, pocket-sized, handheld, computer built-in, or in-vehicle mobile apparatus.

In the embodiments of the present invention, a base station may be a base transceiver station (English full name: Base Transceiver Station, BTS for short) in GSM or CDMA, or may be a NodeB (NodeB) in WCDMA, or may further be an evolved NodeB (English full name: evolved Node B, eNB or e-NodeB for short) in LTE, and is not limited in the present invention.

Figure 1:
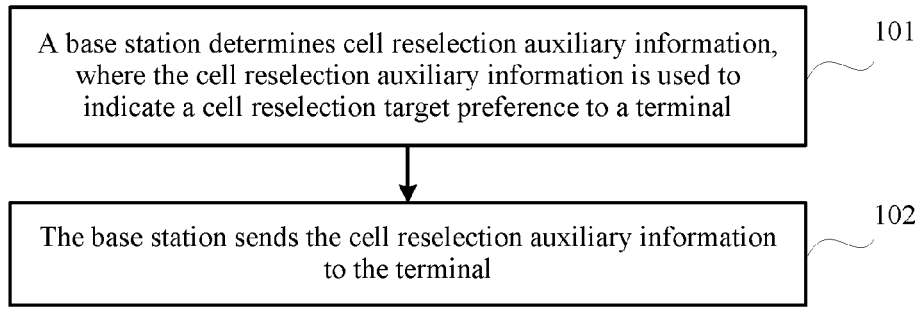
FIG. 1 is a schematic flowchart of a cell selection auxiliary information indication method on a network side according to an embodiment of the present invention.

Referring to FIG. 1, FIG. 1 is a schematic flowchart of a cell selection auxiliary information indication method that is implemented on a base station side according to an embodiment of the present invention. The process is implemented on a network side and may be executed by a base station. The base station herein may be a macro base station, may be another type of base station such as a micro cell base station, or may further be another type of access equipment such as an AP (English: access point, Chinese: access point).

As shown in the figure, the process may include the following steps:

Step 101: The base station determines cell selection auxiliary information, where the cell selection auxiliary information is used to indicate a cell reselection target preference to a terminal.

Step 102: The base station sends the cell selection auxiliary information to the terminal.

The cell selection auxiliary information is mainly used to enable the terminal to determine a cell selection target preference when the terminal performs cell selection or cell reselection, for example, which type of carrier or which base station is preferably selected as a cell selection target. In this way, the terminal can perform the cell selection or reselection on the basis of a cell selection or reselection criterion and with reference to the cell selection target preference indicated by the cell selection auxiliary information.

Preferably, the cell selection auxiliary information may be specifically used to indicate one type or any combination of the following content:

Indication content 1: If the terminal has no CRS (English: Cell-specific reference signal, Chinese: cell-specific reference signal) interference suppression capability or interference cancellation capability, the terminal is instructed to use a carrier that is configured to be used to avoid interference to a neighboring cell as a high-priority cell selection or reselection target or a preferred resident carrier.

Indication content 2: If the terminal has the CRS interference suppression capability or interference cancellation capability, the terminal is instructed to use the carrier that is configured to be used to avoid interference to a neighboring cell as a low-priority cell selection or reselection target or a non-preferred resident carrier.

Further, an application scenario of the indication content 1 is:

if the terminal has no CRS interference suppression capability or interference cancellation capability, a candidate target set determined by the terminal includes multiple carriers configured on an interfered base station, the multiple carriers have a highest priority, and a first carrier in the multiple carriers is configured by an interfering base station as a carrier used to avoid interference to a neighboring cell, the terminal uses the first carrier, configured on the interfered base station, as a high-priority cell selection or reselection target or a preferred resident carrier according to the cell selection auxiliary information; or if the terminal has no CRS interference suppression capability or interference cancellation capability, a candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, the terminal uses the carrier, configured by the interfered base station, as a high-priority cell selection or reselection target or a preferred resident carrier according to the cell selection auxiliary information.

In the multiple mutually interfering base stations, one base station may be interfered with by another one or more base stations, and one base station may also interfere with another one or more base stations. For example, for eNB 1 and eNB 2, eNB 1 may be an interference source of eNB 2, and may also be interfered with by eNB 2. That is, an interfering base station and an interfered base station in the multiple mutually interfering base stations in this embodiment of the present invention are relative.

Further, if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, a second carrier configured by the interfered base station is used as a high-priority cell selection or reselection target or a preferred resident carrier, where the second carrier is one of the N carriers, and a quantity of interference source base stations that configure the second carrier as a carrier used to avoid interference to one or more interfered neighboring cells of the multiple mutually interfering base stations is greater than a quantity of interference source base stations that configure another carrier in the N carriers as a carrier used to avoid interference to one or more interfered neighboring cells of the multiple mutually interfering base stations.

Further, an application scenario of the indication content 2 is:

if the terminal has the CRS interference suppression capability or interference cancellation capability, a candidate target set determined by the terminal includes multiple carriers configured on an interfered base station, the multiple carriers have a highest priority, and a first carrier in the multiple carriers is configured by an interfering base station as a carrier used to avoid interference to a neighboring cell, the terminal uses the first carrier, configured on the interfered base station, as a low-priority cell selection or reselection target or a preferred resident carrier according to the cell selection auxiliary information; or if the terminal has the CRS interference suppression capability or interference cancellation capability, a candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, the terminal uses the carrier, configured by the interfered base station, as a low-priority cell selection or reselection target or a non-preferred resident carrier according to the cell selection auxiliary information.

Further, if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, a second carrier configured by the interfered base station is used as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

For example, in an application scenario, UE A and UE B are two terminals located in an overlapped coverage area of eNB 1 and eNB 2. UE A has no CRS interference suppression capability or interference cancellation capability, and UE B has the CRS interference suppression capability or interference cancellation capability. eNB 1 is an interfering base station, and eNB 2 is an interfered base station, that is, eNB 1 is an interference source of eNB 2. For example, a cell of eNB 1 is a cell of a macro base station, and a cell of eNB 2 is a hotspot cell in a coverage area of eNB 1. Two carriers CC 1 and CC 2 are configured on both eNB 1 and eNB 2, CC 1 and CC 2 have a same priority, and eNB 1 uses CC 2 to synthesize an extension carrier.

After starting cell reselection, UE A determines a cell reselection target set according to a cell reselection criterion. The set includes CC 1 and CC 2 of eNB 2. RSRP (eNB 2, CC 1)>RSRP (eNB 2, CC 2)>RSRP (eNB 2, CC 1)−X, and X is a threshold that is greater than or equal to a difference between the RSRP (eNB 2, CC 1) and the RSRP (eNB 2, CC 2). That is, the RSRP of CC 1 of eNB 2 is greater than the RSRP of CC 2 of eNB 2, but the difference does not exceed X. The threshold X may be set by a system, and may be sent to the terminal by using system information. Because UE A has no CRS interference capability, CC 2 of eNB 2 is still selected as a cell reselection target or a preferred resident carrier even if RSRP (eNB 2, CC 1)>RSRP (eNB 2, CC 2).

After starting cell reselection, UE B determines a cell reselection target set according to a cell reselection criterion. The set includes CC 1 and CC 2 of eNB 2. RSRP (eNB 2, CC 2)−X<RSRP (eNB 2, CC 1)<RSRP (eNB 2, CC 2), and X is a threshold that is greater than or equal to a difference between the RSRP (eNB 2, CC 1) and the RSRP (eNB 2, CC 2). That is, the RSRP of CC 1 of eNB 2 is less than the RSRP of CC 2 of eNB 2. Because UE B has the CRS interference capability, CC 1 of eNB 2 is still selected as a cell reselection target or a preferred resident carrier even if RSRP (eNB 2, CC 1)<RSRP (eNB 2, CC 2), provided that the difference does not exceed X.

It may be learned from the foregoing application scenario that, for the terminal without the CRS suppression capability, even if the RSRP of CC 1 of the interfered base station is greater than the RSRP of CC 2, and some acceptable thresholds are added, CC 2 still has a higher priority in being used as a cell selection or reselection target or a preferred resident carrier. In this way, after UE A is switched to CC 2 of the interfered base station, CC 2 of the interfered base station is not interfered with because CC 2 is used by the interfering base station to synthesize an extension carrier. Therefore, even if UE A has no CRS interference suppression capability or interference cancellation capability, UE A is not interfered with by the interfering base station, thereby ensuring that data is correctly received.

For the terminal with the CRS suppression capability, even if the RSRP of CC 1 of the interfered base station is less than the RSRP of CC 2 (CC 2 is used by the interfering base station to synthesize an extension carrier), and some acceptable thresholds are added, CC 1 still has a higher priority in being used as a cell selection or reselection target or a preferred resident carrier. This can reduce occupation of CC 2, a carrier that has a totally clean subframe for ensuring no CRS interference, thereby ensuring that the terminal without the CRS interference suppression capability or interference cancellation capability is provided with more space for residing on CC 2, ensuring that terminals of earlier versions are free from CRS interference even if they have no CRS interference suppression capability or interference cancellation capability, and further ensuring that data is correctly received.

It may be learned by comparing this embodiment of the present invention with the prior art that, in the prior art, if a terminal randomly resides on a small cell carrier, a great risk is caused because small cell carriers have different load situations in a heterogeneous network. The small cell may include a micro cell, a pico cell, a femto cell, and the like. In addition, a coverage area of the small cell is smaller, and this results in an unnecessary loss of energy consumed for cell searching by the terminal. In another aspect, there is an expectation for best utilization of the small cell. However, according to an existing cell reselection mechanism, it is difficult to achieve a balance between increasing a small cell selection priority and controlling small cell utilization.

In the foregoing application scenario in this embodiment of the present invention, based on the cell selection auxiliary information, the terminal can select a cell more suitable for camping for itself according to the CRS interference suppression capability or interference cancellation capability of the terminal, and in particular, can select different cells or base stations according to the CRS interference suppression capability or interference cancellation capability of the terminal when the terminal reselects an interfered cell or base station from an interfering cell or base station. Compared with the prior art, a cell load balance can be implemented to some extent, and in another aspect, cell resources can be used as fully and properly as possible.

For another example, in another application scenario, UE A has no CRS interference suppression capability or interference cancellation capability, and UE B has the CRS interference suppression capability or interference cancellation capability. UE A and UE B are near coverage areas of eNB 1, eNB 2, and eNB 3 that are adjacent and mutually interfering. eNB 1, eNB 2, and eNB 3 are all configured with two carriers: CC 1 and CC 2, CC 1 and CC 2 have a same priority, and eNB 2 and/or eNB 3 use/uses CC 2 to synthesize an extension carrier.

After starting cell reselection, UE A determines a cell reselection target set according to the cell reselection criterion.

In a case, if the set includes CC 2 of eNB 1 and CC 2 of eNB 3, and RSRP (eNB 1, CC 2)<RSRP (eNB 3, CC 2), that is, the RSRP of CC 2 of eNB 1 is less than the RSRP of CC 2 of eNB 3, because UE A has no CRS interference capability, CC 2 of eNB 1 is still selected as the cell reselection target or the preferred resident carrier even if RSRP (eNB 1, CC 2)<RSRP (eNB 3, CC 2).

In another case, if the set includes CC 2 of eNB 1 and CC 2 of eNB 2, UE A still selects CC 2 of eNB 1 as the cell reselection target or the preferred resident carrier even if RSRP (eNB 1, CC2)<RSRP (eNB 2, CC 2).

In yet another case, if the set includes CC 2 of eNB 1, CC 2 of eNB 2, and CC 2 of eNB 3, UE A still selects CC 2 of eNB 1 as the cell reselection target or the preferred resident carrier even if RSRP (eNB 1, CC2)<RSRP (eNB 2, CC2) <RSRP (eNB 3, CC2) or even if RSRP (eNB 1, CC2)<RSRP (eNB 3, CC2)<RSRP (eNB 2, CC2).

After starting cell reselection, UE B determines a cell reselection target set according to the cell reselection criterion.

In a case, if the set includes CC 2 of eNB 1 and CC 2 of eNB 3, and RSRP (eNB 1, CC 2)>RSRP (eNB 3, CC 2), that is, the RSRP of CC 2 of eNB 1 is greater than the RSRP of CC 2 of eNB 3, because UE B has the CRS interference capability, CC 2 of eNB 3 is still selected as the cell reselection target or the preferred resident carrier even if RSRP (eNB 1, CC 2)>RSRP (eNB 3, CC 2).

In another case, if the set includes CC 2 of eNB 1 and CC 2 of eNB 2, UE B still selects CC 2 of eNB 2 as the cell reselection target or the preferred resident carrier even if RSRP (eNB 1, CC2)>RSRP (eNB 2, CC 2).

In another case, if the set includes CC 2 of eNB 1 and CC 2 of eNB 3, UE B still selects CC 2 of eNB 3 as the cell reselection target or the preferred resident carrier even if RSRP (eNB 1, CC2)>RSRP (eNB 3, CC 2).

In another case, if the set includes CC 2 of eNB 1, CC 2 of eNB 2, and CC 2 of eNB 3, and RSRP (eNB 1, CC2)>RSRP (eNB 2, CC2)>RSRP (eNB 3, CC2), UE B still selects CC 2 of eNB 3 as the cell reselection target or the preferred resident carrier.

In yet another case, if the set includes CC 2 of eNB 1, CC 2 of eNB 2, and CC 2 of eNB 3, UE B still selects CC 2 of eNB 2 as the cell reselection target or the preferred resident carrier even if RSRP (eNB 1, CC2)>RSRP (eNB 3, CC2) >RSRP (eNB 2, CC2).

For another example, in another application scenario, UE A has no CRS interference suppression capability or interference cancellation capability, and UE B has the CRS interference suppression capability or interference cancellation capability. UE A and UE B are near coverage areas of eNB 1, eNB 2, and eNB 3 that are adjacent and mutually interfering, three carriers CC 1, CC 2, and CC 3 are configured on all of eNB 1, eNB 2, and eNB, and CC 1, CC 2, and CC 3 have a same priority. In addition, one base station, eNB 1, configures CC 2 as an extension carrier, while two base stations, eNB 1 and eNB 2, configure CC 3 as an extension carrier. Therefore, when cell reselection conditions are the same, in comparison, UE A uses CC 3 of eNB 3 as a high-priority cell reselection target or a preferred resident carrier, and UE B uses CC 3 of eNB 3 as a low-priority cell reselection target or a non-preferred resident carrier.

It may be learned from the foregoing application scenario that, for the terminal without the CRS suppression capability, even if the RSRP of CC 2 of the interfered base station is less than the RSRP of CC 2 of the interfering base station (CC 2 is used by the interfering base station to synthesize an extension carrier), and some acceptable thresholds are added, CC 2 of the interfered base station still has a higher priority in being used as a cell selection or reselection target or a resident carrier. In this way, after UE A is switched to CC 2 of the interfered base station, CC 2 of eNB 1 is not interfered with because CC 2 of the interfering base station is used to synthesize an extension carrier. Therefore, even if UE A has no CRS interference suppression capability or interference cancellation capability, UE A is not interfered with by the interfering base station.

For the terminal with the CRS suppression capability, even if the RSRP of CC 2 of the interfered base station is greater than the RSRP of CC 2 of the interfering base station (CC 2 is used by the interfering base station to synthesize an extension carrier), and some acceptable thresholds are added, CC 2 of the interfering base station still has a higher priority in being used as a cell selection or reselection target or a resident carrier. This provides the terminal without the CRS interference suppression capability or interference cancellation capability with more space for residing on CC 2 of the interfered base station, thereby ensuring that terminals of earlier versions are free from CRS interference even if they have no CRS interference suppression capability or interference cancellation capability, and further ensuring that data is correctly received.

In the foregoing application scenario in this embodiment of the present invention, based on the cell selection auxiliary information, the terminal can select a cell more suitable for camping for itself according to the CRS interference suppression capability or interference cancellation capability of the terminal, and in particular, can select different cells or base stations according to the CRS interference suppression capability or interference cancellation capability of the terminal when the terminal reselects an interfered cell or base station from an interfering cell or base station. Compared with the prior art, a cell load balance can be implemented to some extent, and in another aspect, cell resources can be used as fully and properly as possible.

The following first explains some names and terms in the content indicated by the cell selection auxiliary information.

The terminal without the CRS interference suppression capability or interference cancellation capability may be a terminal in an LTE Release 8, Release 9, or Release 10 system or a terminal without an advanced receiver (English: advanced receiver) in a new version (for example, a version later than LTE Release 11 or Release 12). The advanced receiver may be a codeword-level interference cancellation (codeword-level interference cancellation, CWIC for short) receiver.

The terminal with the CRS interference suppression capability or interference cancellation capability may be a terminal in an LTE Release 10 or Release 11 system or a terminal with an advanced receiver (advanced receiver) in a new version. The advanced receiver may be a CWIC receiver.

The carrier used to avoid interference to a neighboring cell is any carrier capable of providing less control information transmission. The control signal may include a CRS and the like. The carrier used to avoid interference to a neighboring cell may be an extension carrier (English: extension carrier) or a new carrier type (English: new carrier type, NCT for short) or a segmentation carrier (English: segmentation carrier) or a carrier that is in a subsequent evolved system and that can avoid interference to another cell.

The extension carrier or the new carrier type or the segmentation carrier is an important topic in a carrier aggregation (English: Carrier Aggregation, CA for short) scheduling scenario. In an LTE Release 11 system, a main target scenario for CA enhancement is a heterogeneous network scheduling scenario. A use situation is as follows: An extension carrier is synthesized in an aggressor cell (English: aggressor cell) such as a macro cell, so that a totally clean null subframe can be obtained in the extension carrier for the aggressor cell. This can form, in a victim cell such as a micro cell, some resources that are of a time domain (English: time domain) and a frequency domain (English: frequency domain) and that free a victim terminal in the victim cell totally from interference. Because no CRS or PDCCH (English: Physical Downlink Control Channel, Chinese: physical downlink control channel) transmission is performed on these resources, these resources can form complete protection on the victim terminal in the victim cell. CRS or PDCCH transmission is not performed on such a null subframe or wireless resource feature, and this helps reduce inter-cell interference.

In this embodiment of the present invention, the aggressor cell is an interfering cell, the victim cell is an interfered cell, and the victim terminal is an interfered terminal. For example, eNB 1 is a macro cell, and eNB 2 is a micro cell in a coverage area of eNB 1. Therefore, eNB 1 interferes with eNB 2, eNB 1 is an aggressor cell of eNB 2, and eNB 2 is a victim cell. If the carrier CC 2 of eNB 1 is used to synthesize an extension carrier, eNB 1 does not perform CRS or PDCCH transmission on CC 2, and therefore does not interfere with a terminal that uses CC 2 to perform transmission in a coverage area of eNB 2.

In step 101, the base station may use multiple expression forms to express the cell selection auxiliary information determined by the base station. For example, the cell selection auxiliary information determined by the base station may include one type or a combination of the following content:

carrier configuration characteristic information;
a carrier with a specified characteristic; and
resident carrier preference information of the terminal.

Specifically, the carrier configuration characteristic may be used to represent whether a carrier is configured or synthesized as a carrier used to avoid interference to a neighboring cell, for example, whether a carrier configured by an interfering base station or an interfering cell is synthesized as an extension carrier. Preferably, the carrier configuration characteristic information may include a carrier identifier and indication information corresponding to the carrier identifier, where the indication information is used to indicate whether a corresponding carrier is configured as a carrier used to avoid interference to a neighboring cell.

For example, the carrier configuration characteristic information may be expressed in a form in the following Table 1.

TABLE 1

| Carrier identifier | Indication identifier | Meaning of the indication identifier |
|---|---|---|
| CC 1 | 1 | Not configured as an extension carrier |
| CC 2 | 0 | Configured as an extension carrier |

CC 1 and CC 2 are carriers configured on the interfering base station eNB 1.

Specifically, the carrier with a specified characteristic configured on the base station includes a carrier that is configured to be used to avoid interference to a neighboring cell, such as a carrier configured, on an interfering base station or an interfering cell, as an extension carrier, or as a new carrier type, or as a segmentation carrier; or may include a carrier with a characteristic of representing a specific capability; or may not only include the carrier that is configured to be used to avoid interference to a neighboring cell, but also include the carrier with a characteristic of representing a specific capability.

For example, the carrier with a specified characteristic configured on the base station may be expressed as a carrier list. Each carrier in the list includes an identifier of a carrier with a specified characteristic configured on the base station, such as an identifier of a carrier configured as an extension carrier.

Specifically, the resident carrier preference information of the terminal may include an identifier of a carrier that is configured to be used to avoid interference to a neighboring cell and a list of a first terminal type and/or a list of a second terminal type that are/is corresponding to the identifier of the carrier. A terminal indicated by the first terminal type has no CRS interference suppression capability or interference cancellation capability, and uses the carrier that is configured to be used to avoid interference to a neighboring cell as a high-priority cell selection or reselection target. A terminal indicated by the second terminal type has the CRS interference suppression capability or interference cancellation capability, and uses the carrier that is configured to be used to avoid interference to a neighboring cell as a low-priority cell selection or reselection target. That is, the information may be used to indicate the following to the terminal with or without the CRS interference suppression capability or interference cancellation capability: Corresponding to the terminal with or without the CRS interference suppression capability or interference cancellation capability, the carrier that is configured to be used to avoid interference to a neighboring cell is used as a high-priority cell reselection target or a low-priority cell selection or reselection target.

For example, the resident carrier preference information of the terminal may be expressed in a form in the following Table 2.

message for sending. The base station may also send the cell selection auxiliary information to the terminal by using dedicated signaling. Preferably, the dedicated signaling may be radio resource control (English: Radio Resource Control, RRC for short) connection release signaling.

The foregoing process shown in FIG. 1 may be executed by an interfering base station or an interfering cell or by an interfered base station or an interfered cell.

Specifically, if the process shown in FIG. 1 is executed by an interfering base station, in step 101, the interfering base station determines the cell selection auxiliary information according to a carrier configuration characteristic of the base station, and in step 102, the interfering base station sends the cell selection auxiliary information determined in step 101 to the terminal. Further, the interfering base station may send the determined cell reselection information to an interfered base station by using an interface between the base stations.

If the process shown in FIG. 1 is executed by an interfered base station, in step 101, the interfered base station receives, from an interface between base stations, the cell selection auxiliary information sent by an interfering base station, and in step 102, the interfered base station sends the cell selection auxiliary information received in step 101 to the terminal. Alternatively, if the process shown in FIG. 1 is executed by an interfered base station, in step 101, the interfered base station determines the cell selection auxiliary information according to a carrier configuration characteristic of the base station, and in step 102, the interfered base station sends the cell selection auxiliary information determined in step 101 to the terminal.

For example, after performing extension carrier configuration by itself or receiving carrier configuration from an operation, administration, and maintenance (English: Operation Administration and Maintenance, OAM for short) system, an interfering base station sends, by using a broadcast message, an identifier of a carrier used for synthesizing an extension carrier, and sends the identifier of the carrier used for synthesizing an extension carrier to an interfered base station by using an interface between the base stations. The interfered base station sends, by using a broadcast message, the identifier of the carrier used for synthesizing an extension carrier to the terminal. The terminal receiving the broadcast message may determine, according to whether the terminal has the CRS interference suppression capability or

TABLE 2

| Carrier identifier (Carrier that is configured to be used to avoid interference to a neighboring cell) | List of first terminal type (A carrier that is configured to be used to avoid interference to a neighboring cell is used as a high-priority cell selection or reselection target.) | List of second terminal type (A carrier that is configured to be used to avoid interference to a neighboring cell is used as a low-priority cell selection or reselection target.) |
| --- | --- | --- |
| CC 2 | Terminal in an LTE Release 8/9/10 system, or terminal of a new version without an advanced receiver, or any terminal without the CRS interference suppression capability or interference cancellation capability | LTE Release 11/12, or terminal of a new version with an advanced receiver, or terminal with the CRS interference suppression capability or interference cancellation capability |

In step 102, the base station may send the cell selection auxiliary information to the terminal by using a broadcast message. Configuration information of the extension carrier may be carried in SIB 2 (System Information Block, SIB for short, Chinese: system information block) of the broadcast interference cancellation capability, whether the carrier can be used as a high-priority cell selection or reselection target.

For another example, after performing extension carrier configuration by itself or receiving carrier configuration from an OAM system, an interfering base station locally generates the cell selection auxiliary information on one hand, and sends the cell selection auxiliary information to an interfered base station by using an interface between the base stations on the other hand. When releasing an RRC connection of a terminal, an interfering base station or an interfered base station may send the foregoing cell selection auxiliary information to the terminal by using RRC connection release signaling, so that the terminal determines, according to whether the terminal has the CRS interference suppression capability or interference cancellation capability, whether a corresponding carrier may be used as a high-priority cell selection or reselection target, and performs cell reselection with reference to a cell reselection criterion after entering an idle mode.

It may be learned that, when the cell selection auxiliary information is sent by using a broadcast message, a base station or a terminal in a coverage area of a cell can obtain the cell selection auxiliary information; and when the cell selection auxiliary information is sent by using dedicated signaling, the cell selection auxiliary information can be sent to a terminal only when the terminal enters an idle mode, and compared with the sending by using a broadcast message, resource overheads of the broadcast message can be saved. In a specific implementation, according to a network environment or a performance requirement, a selection may be performed between the two sending manners, or the two sending manner may be used in combination.

It may be learned from a description in the foregoing embodiment of the present invention that, a base station sends cell selection auxiliary information to a terminal, so that the terminal determines a cell selection or reselection target preference according to the cell selection auxiliary information. In this way, the terminal can perform cell selection or reselection with reference to a cell selection or reselection criterion and the cell selection auxiliary information. Compared with the prior art in which cell reselection is performed according only to a cell reselection criterion, in the present invention, the terminal can select a more suitable cell.

Specifically, that the base station may indicate a cell selection or reselection preference of receiver types with different capabilities (for example, with the CRS interference suppression capability or interference cancellation capability or without the CRS interference suppression capability or interference cancellation capability) includes: instructing a terminal with an advanced receiver (such as a receiver with the CRS interference suppression capability or interference cancellation capability) to reside on a carrier that facilitates an interference cancellation function of the terminal and that is configured by a corresponding interference source; and instructing a terminal without an advanced receiver (such as a receiver without the CRS interference suppression capability or interference cancellation capability) to reside on a carrier on which the interference cancellation function of the terminal cannot work and that is configured by a corresponding interference source. In this way, a load balance is implemented, an unnecessary switch is reduced, and improvement of interference cancellation performance is ensured.

In addition, in the prior art, if a terminal with a high capability accesses a cell with a low capability, when some functions are implemented, it is possible that an expected purpose cannot be achieved due to a capability mismatch between the terminal and an eNB. Consequently, the eNB has to initiate a handover process so that the terminal connects to a cell with a higher capability. This causes extra signaling overheads. However, by using this embodiment of the present invention, because the base station sends the cell selection auxiliary information to the terminal, the terminal can select a suitable cell for selection or reselection according to a capability of the terminal. In this way, capabilities are matched between the terminal and the eNB, and this can avoid occurrence of the foregoing case to some extent.

Figure 2:
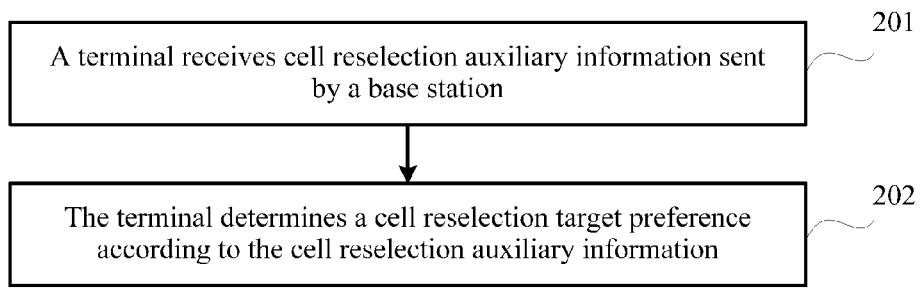
FIG. 2 is a schematic flowchart of a cell selection auxiliary information indication method on a terminal side according to an embodiment of the present invention.

Referring to FIG. 2, FIG. 2 is a schematic flowchart of a cell selection auxiliary information indication method that is implemented on a terminal side according to an embodiment of the present invention. The process is implemented on the terminal side. A terminal herein may be a device with a wireless communications capability such as a device with a wireless cellular communications capability and capable of communicating with a base station.

As shown in the figure, the process may include the following steps:

Step 201: The terminal receives cell selection auxiliary information sent by the base station.

Step 202: The terminal determines a cell selection or reselection target preference according to the cell selection auxiliary information.

The cell selection auxiliary information is mainly used to enable the terminal to determine a cell reselection target preference when the terminal performs cell selection or reselection, for example, which type of carrier or which base station or which cell is preferably selected as a cell selection or reselection target. In this way, the terminal can perform the cell selection or reselection on the basis of a cell selection or reselection criterion and with reference to the cell selection or reselection target preference indicated by the cell selection auxiliary information.

For content included in the cell selection auxiliary information, reference may be made to the foregoing embodiment, and details are not repeatedly described herein. In addition, "the terminal without the CRS interference suppression capability or interference cancellation capability", "the terminal with the CRS interference suppression capability or interference cancellation capability", and "the carrier used to avoid interference to a neighboring cell" that are related have same meanings as those in the foregoing embodiment.

Further, an example description of an application scenario of the indication content 1 and an example description of an application scenario of the indication content 1 are the same as those in the foregoing embodiment, and details are not repeatedly described herein.

It may be learned by comparing this embodiment of the present invention with the prior art that, in the prior art, if a terminal randomly resides on a small cell carrier, a great risk is caused because small cell carriers have different load situations in a heterogeneous network. The small cell may include a micro cell, a pico cell, a femto cell, and the like. In addition, a coverage area of the small cell is smaller, and this results in an unnecessary loss of energy consumed for cell searching by the terminal. In another aspect, there is an expectation for best utilization of the small cell. However, according to an existing cell reselection mechanism, it is difficult to achieve a balance between increasing a small cell selection priority and controlling small cell utilization.

In the foregoing application scenario in this embodiment of the present invention, based on the cell selection auxiliary information, the terminal can select a cell more suitable for camping for itself according to the CRS interference suppression capability or interference cancellation capability of the terminal, and in particular, can select different cells or base stations according to the CRS interference suppression capability or interference cancellation capability of the terminal when the terminal reselects an interfered cell or base station from an interference source cell or base station. Compared with the prior art, a cell load balance can be implemented to some extent, and in another aspect, cell resources can be used as fully and properly as possible.

In the foregoing application scenario in this embodiment of the present invention, based on the cell selection auxiliary information, the terminal can select a cell more suitable for camping for itself according to the CRS interference suppression capability or interference cancellation capability of the terminal, and in particular, can select different cells or base stations according to the CRS interference suppression capability or interference cancellation capability of the terminal when the terminal reselects an interfered cell or base station from an interfering cell or base station. Compared with the prior art, a cell load balance can be implemented to some extent, and in another aspect, cell resources can be used as fully and properly as possible.

As described in the foregoing embodiment, the base station may use multiple expression forms to express the cell selection auxiliary information determined by the base station. For example, the cell selection auxiliary information determined by the base station may include one type or a combination of the following content:

carrier synthesis or configuration characteristic information;

a carrier with a specified characteristic; and resident carrier preference information of the terminal.

Specific meanings and specific expression forms of the foregoing content are the same as those in the foregoing embodiment, and details are not repeatedly described herein.

For example, if the carrier synthesis or configuration characteristic information is expressed as content in Table 1, in step 202, the terminal may determine one type or any combination of the following content.

If the terminal has no CRS interference suppression capability or interference cancellation capability, CC 2 may be used as a high-priority cell selection or reselection target when the cell selection or reselection is performed.

For example, when the cell reselection is performed, if both CC 1 and CC 2 of an interfered base station have a highest carrier priority in a candidate target cell set selected according to the cell reselection criterion, the terminal uses CC 2 of the interfered base station as the cell reselection target even if a signal strength measurement value of CC 2 is less than a signal strength measurement value of CC 1.

If the terminal has no CRS interference suppression capability or interference cancellation capability, and a current resident carrier is CC 2, an interfered base station that has CC 2 configured is used as a high-priority cell reselection target when intra-frequency cell reselection is performed.

For example, when the intra-frequency cell reselection is performed, if the terminal currently resides on CC 2 of an interference source base station, in a candidate target cell set selected according to the cell reselection criterion, the terminal uses the interfered base station as the cell reselection target even if a signal strength measurement value of CC 2 of the interfered base station is less than a measurement value of CC 2 of the interference source base station.

If the terminal has the CRS interference suppression capability or interference cancellation capability, CC 2 may be used as a low-priority cell selection or reselection target when the cell selection or reselection is performed.

For example, when the cell reselection is performed, if CC 1 and CC 2 of an interfered base station have a highest carrier priority in a candidate target cell set selected according to the cell reselection criterion, the terminal uses CC 1 of the interfered base station as the cell reselection target even if a signal strength measurement value of CC 2 is greater than a signal strength measurement value of CC 1.

If the terminal has the CRS interference suppression capability or interference cancellation capability, and a current resident carrier is CC 2, an interfered base station that has CC 2 configured is used as a low-priority cell reselection target when intra-frequency cell reselection is performed.

For example, when the intra-frequency cell reselection is performed, if the terminal currently resides on CC 2 of an interference source base station, in a candidate target cell set selected according to the cell reselection criterion, the terminal uses the interference source base station as the cell reselection target even if a signal strength measurement value of CC 2 of the interfered base station is greater than a measurement value of CC 2 of the interference source base station.

As described in the foregoing embodiment, the base station may send the cell selection auxiliary information to the terminal by using a broadcast message, or may send the cell selection auxiliary information to the terminal by using dedicated signaling. The dedicated signaling is RRC connection release signaling. Correspondingly, the terminal may receive the cell selection auxiliary information by using the broadcast message or the dedicated signaling sent by the base station. For example, a terminal in a coverage area of an interfering base station receives carrier configuration or synthesis information that is sent by the interfering base station by using a broadcast message or dedicated signaling and that is of an extension carrier configured on the interfering base station. Alternatively, after receiving, by using an interface between base stations, carrier configuration or synthesis information that is of an extension carrier and that is sent by an interfering base station, an interfered base station sends the carrier configuration or synthesis information of the extension carrier to a terminal in a coverage area of the interfered base station by using a broadcast message or dedicated signaling.

It may be learned from a description in the foregoing embodiment of the present invention that, a base station sends cell selection auxiliary information to a terminal, so that the terminal determines a cell selection or reselection target preference according to the cell selection auxiliary information. In this way, the terminal can perform cell selection or reselection with reference to a cell selection or reselection criterion and the cell selection auxiliary information. Compared with the prior art in which cell selection or reselection is performed according only to a cell selection or reselection criterion, in the present invention, the terminal can select a more suitable cell.

Specifically, that the base station may indicate a cell selection or reselection preference of receiver types with different capabilities (for example, with the CRS interference suppression capability or interference cancellation capability or without the CRS interference suppression capability or interference cancellation capability) includes: instructing a terminal with an advanced receiver (such as a receiver with the CRS interference suppression capability or interference cancellation capability) to reside on a carrier that facilitates an interference cancellation function of the terminal and that is configured by a corresponding interference source; and instructing a terminal without an advanced receiver (such as a receiver without the CRS interference suppression capability or interference cancellation capability) to reside on a carrier on which the interference cancellation function of the terminal cannot work and that is configured by a corresponding interference source. In this way, a load balance is implemented, an unnecessary switch is reduced, and improvement of interference cancellation performance is ensured.

Figure 3:
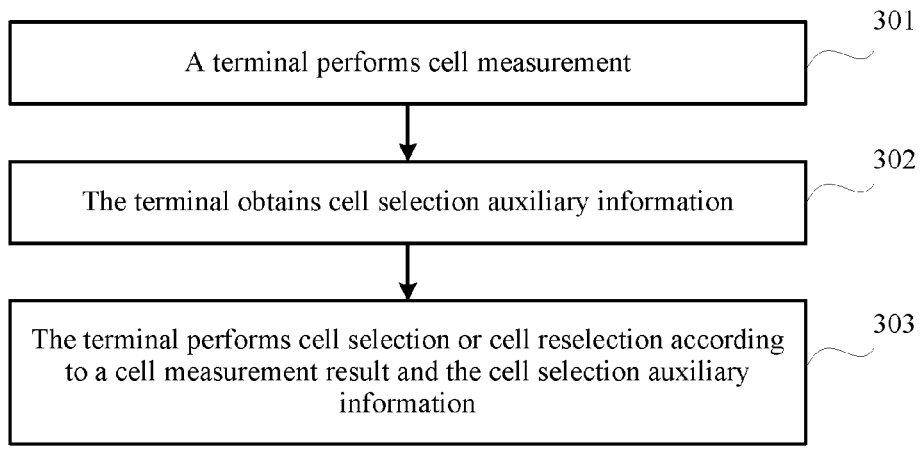
FIG. 3 is a schematic flowchart of a cell selection method according to an embodiment of the present invention.

Referring to FIG. 3, FIG. 3 is a schematic flowchart of a cell selection method according to an embodiment of the present invention. The process may be executed by a terminal.

As shown in the figure, the process may include the following steps:

Step 301: The terminal performs cell measurement.

Step 302: The terminal obtains cell selection auxiliary information.

Step 303: The terminal performs cell selection or cell reselection according to a cell measurement result and the cell selection auxiliary information.

The cell selection auxiliary information is received from a base station, or may be obtained in another manner, for example, preconfigured on the terminal.

The cell selection auxiliary information is used to indicate a cell selection or reselection target preference to the terminal. Content and a meaning of the cell selection auxiliary information, and a manner of sending the cell selection auxiliary information on a base station side, and a manner of receiving the cell selection auxiliary information on a terminal side are the same as those in the foregoing embodiments, and details are not repeatedly described herein.

In step 301, the terminal may start measurement on a neighboring cell according to a cell reselection triggering condition defined by a cell reselection rule.

For example, according to a stipulation of an LTE protocol, for intra-frequency cell reselection, intra-frequency cell reselection measurement is started when the terminal detects that a neighboring cell meets the following condition:

$$Sservingcell < Sintrasearch$$

Sservingcell is a parameter S of a serving cell, and Sintrasearch is a threshold parameter for determining whether to perform intra-frequency cell reselection. A calculation formula of Sservingcell is:

$$Sservingcell = Qrxlevmeas - (Qrxlevmin + Q_{rx}levminoffset) - Pcompensation$$

Qrxlevmeas is an RSRP value of a measured cell, Qrxlevmin is a minimum received strength requirement of an RSRP in a cell, Qrxlevminoffset is an offset, Pcompensation=Max($P_{EMAX} - P_{UMAX}$, 0), $P_{EMAX}$ is a maximum uplink transmit power of a terminal allowed in a cell, and $P_{UMAX}$ is a maximum uplink transmit power determined by a terminal capability.

In terms of inter-frequency cell reselection, inter-frequency cell reselection measurement is always performed on a neighboring cell whose priority is higher than that of a serving cell of the terminal. For a neighboring cell whose priority is equal to or greater than that of the serving cell of the terminal, intra-frequency reselection measurement is started when the terminal detects that the following condition is met:

$$Sservingcell < Snonintrasearch$$

Sservingcell is a parameter S of the serving cell, and Snonintrasearch is a threshold parameter for determining whether to perform inter-frequency cell reselection. A calculation formula of Sservingcell is as described above.

In step 303, the terminal may first determine a candidate target set for cell selection or reselection according to the cell measurement result, where the candidate target set includes a candidate target cell or a candidate target base station; and then, the terminal may select a cell from the candidate target set according to the cell selection auxiliary information.

For example, in an intra-frequency cell reselection process, if a neighboring cell meets an S criterion and an R criterion for cell reselection, the neighboring cell is determined as a candidate target. In an inter-frequency cell reselection process, for a neighboring cell whose priority is higher than that of the serving cell, if Stargetcell>threshXHigh, where Stargetcell is a parameter S of the neighboring cell and threshXHigh is a threshold, the neighboring cell is determined as a candidate target; for a neighboring cell whose priority is equal to that of the serving cell, if the neighboring cell meets the S criterion and the R criterion for cell reselection, the neighboring cell is determined as a candidate target; and for a neighboring cell whose priority is higher than that of the serving cell, if Sservingcell<threshServingLow and Stargetcell>threshXLow, where Sservingcell is a parameter S of the serving cell, Stargetcell is a parameter S of the neighboring cell, and threshServingLow and Stargetcell>threshXLow are two thresholds respectively, the neighboring cell is determined as a candidate target.

The S criterion for cell reselection is: A parameter S of a neighboring cell is greater than Sintrasearch.

The R criterion for cell reselection is: Within time of parameter Treselection, Rt of a neighboring cell constantly exceeds Rs of a serving cell, where $$Rs = Qmeas,s + QHyst; \text{ and}$$

$$Rt = Qmeas,t - Qoffset$$

Qmeas,s is an RSRP value of the serving cell, Qmeas,t is an RSRP value of the neighboring cell, Qoffset is an offset, and QHyst is hysteresis occurring when a cell reselection decision is made.

As described above, the cell selection auxiliary information is specifically used to indicate one type or any combination of the following content:

if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and if the terminal has the CRS interference suppression capability or interference cancellation capability, the carrier that is configured to be used to avoid interference to a neighboring cell is used as a low-priority cell selection or reselection target or a non-preferred resident carrier.

On the basis of the foregoing cell selection auxiliary information, in a cell reselection process, the terminal may set or adjust a selection priority for a candidate target in the candidate target set, and select a cell according to the set or adjusted selection priority.

Specifically, if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, the first carrier configured on the interfered base station is used as a high-priority cell selection or reselection target or a preferred resident carrier; or if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, the carrier configured by the interfered base station is used as a high-priority cell selection or reselection target or a preferred resident carrier; or if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, the first carrier configured on the interfered base station is used as a low-priority cell selection or reselection target or a non-preferred resident carrier; or if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, the carrier configured by the interfered base station is used as a low-priority cell selection or reselection target or a non-preferred resident carrier.

Further, if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, a second carrier configured by the interfered base station is used as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, a second carrier configured by the interfered base station is used as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

In step 303, according to different candidate targets, that the terminal performs cell selection or reselection in step 303 includes multiple cases. The following only describes several typical examples.

Case 1: If the candidate target set includes only one candidate target, for example, a candidate target cell or a candidate target base station.

In a possible implementation, the candidate target is selected as a cell selection or reselection target.

In another possible implementation, if terminal sets the candidate target as a high-priority candidate target according to the cell selection auxiliary information, the candidate target is selected as a cell selection or reselection target; or if the terminal sets the candidate target as a low-priority candidate target according to the cell selection auxiliary information, the terminal continues camping on a source base station or a source cell.

Case 2: If the candidate target set includes multiple candidate targets, and carrier priorities or cell priorities of the candidate targets are the same, priorities of the candidate targets are separately determined according to the cell selection auxiliary information, and a cell selection or reselection target is selected according to the determined priorities, that is, a candidate target with a higher priority is selected as the cell selection or reselection target.

Further, if the priorities of the candidate targets determined according to the cell selection auxiliary information are the same, a candidate target with a greater RSRP value is selected as the cell selection or reselection target according to RSRP values of these candidate targets.

Case 3: If the candidate target set includes multiple candidate targets, and carrier priorities or cell priorities of the candidate targets are different, a candidate target with a highest carrier priority or cell priority is selected as a cell selection or reselection target.

Further, if there are multiple candidate targets with the highest carrier priority or cell priority, priorities of these candidate targets with the highest carrier priority or cell priority are determined according to the cell selection auxiliary information, and the cell reselection target is selected according to the determined priorities, that is, a candidate target with a higher priority is selected as the cell selection or reselection target.

Further, if the priorities of the candidate targets determined according to the cell selection auxiliary information are the same, a candidate target with a greater RSRP value is selected as the cell selection or reselection target according to RSRP values of these candidate targets with the highest carrier priority or cell priority.

It may be learned from a description in the foregoing embodiment that, a terminal performs cell selection or cell reselection according to cell selection auxiliary information, so that the terminal can perform the cell selection or the cell reselection with reference to the cell selection auxiliary information. Compared with the prior art in which cell reselection is performed according only to a cell reselection criterion, in the present invention, the terminal can select a more suitable cell.

Based on a same technical conception, an embodiment of the present invention further provides a terminal.

Figure 4:
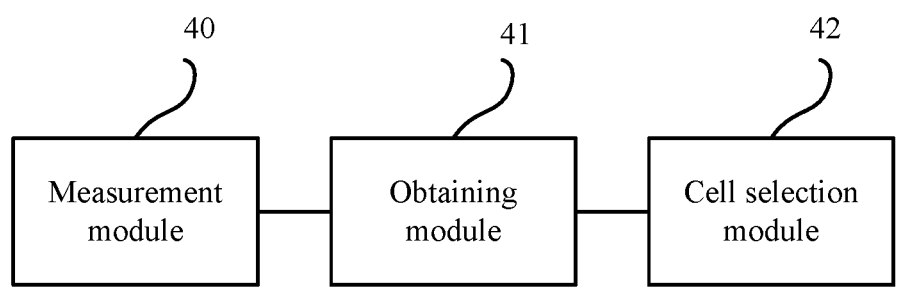
FIG. 4 is a schematic structural diagram of a cell selection apparatus according to an embodiment of the present invention.

Referring to FIG. 4, FIG. 4 shows a terminal provided in this embodiment of the present invention. The terminal may include a measurement module 40, an obtaining module 41, and a cell selection module 42.

The measurement module 40 is configured to perform cell measurement.

The obtaining module 41 is configured to obtain cell selection auxiliary information.

The cell selection module 42 is configured to perform cell selection or cell reselection according to a cell measurement result and the cell selection auxiliary information.

Preferably, the cell selection module 42 may be specifically configured to: determine a candidate target set for the cell selection or reselection according to the cell measurement result, where the candidate target set includes a candidate target cell or a candidate target base station; and select a cell from the candidate target set according to the cell selection auxiliary information.

Preferably, the cell selection auxiliary information includes one type or any combination of the following content:

if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and if the terminal has the CRS interference suppression capability or interference cancellation capability, the carrier that is configured to be used to avoid interference to a neighboring cell is used as a low-priority cell selection or reselection target or a non-preferred resident carrier.

Correspondingly, the cell selection module 42 may be specifically configured to:

if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a high-priority cell selection or reselection target or a preferred resident carrier; or if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a high-priority cell selection or reselection target or a preferred resident carrier; or if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a low-priority cell selection or reselection target or a non-preferred resident carrier; or if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a low-priority cell selection or reselection target or a non-preferred resident carrier.

Further, the cell selection module 42 may be further configured to:

if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

Preferably, the cell selection auxiliary information includes one type or a combination of the following information: carrier configuration characteristic information, a carrier with a specified characteristic, and resident carrier preference information of the terminal.

Preferably, the obtaining module 41 may be specifically configured to receive the cell selection auxiliary information from a base station. Further, the obtaining module 41 may receive the cell selection auxiliary information from the base station by using a broadcast message or dedicated signaling.

It should be noted that, reference may be made to description in the foregoing embodiments for another function implemented by the various function modules of the terminal in addition to the above-mentioned functions of the function modules of the terminal. In addition, for content, a meaning, or an expression form of related information, reference may also be made to the description in the foregoing embodiments, and details are not repeatedly described herein.

Based on a same technical conception, an embodiment of the present invention further provides a terminal.

Figure 5:
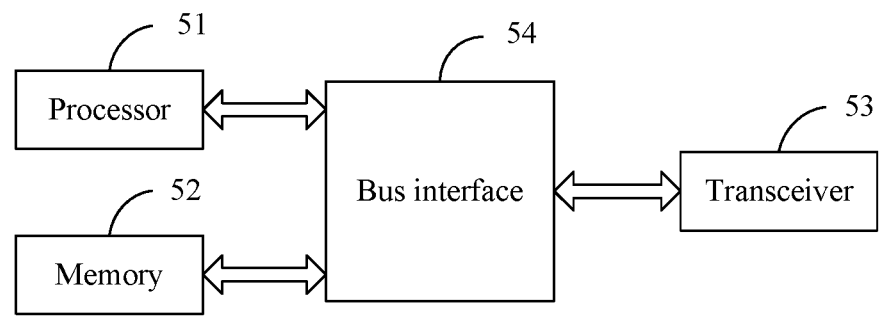
FIG. 5 is a schematic structural diagram of a terminal according to another embodiment of the present invention.

Referring to FIG. 5, FIG. 5 shows a terminal provided in this embodiment of the present invention. The terminal may include a processor 51, a memory 52, a transceiver 53, and a bus interface 54. The processor 51, the memory 52, and the transceiver 53 are connected by using the bus interface 54. The processor 51 is responsible for managing a bus architecture and general processing. The memory 52 can store data used when the processor 51 performs an operation. The transceiver 53 is configured to receive and transmit data under control of the processor 51.

In FIG. 5, the bus architecture may include any number of interconnected buses and bridges, which specifically link various circuits of one or more processors represented by the processor 51 and of a memory represented by the memory 52. The bus architecture may further link various other circuits of a peripheral device, a voltage regulator, a power management circuit, and the like. This is well known in the art, and therefore no further description is provided in this specification. A bus interface provides an interface. The transceiver 53 may be multiple elements, that is, may include a transmitter and a receiver, providing units for communicating with various other apparatuses on a transmission medium.

The processor 51 is configured to read a program in the memory 52, to execute the following process:
    performing, by the terminal, cell measurement;
    obtaining cell selection auxiliary information; and
    performing cell selection or cell reselection according to a cell measurement result and the cell selection auxiliary information.

Specifically, the processor 51 may be specifically configured to: determine a candidate target set for the cell selection or reselection according to the cell measurement result, where the candidate target set includes a candidate target cell or a candidate target base station; and select a cell from the candidate target set according to the cell selection auxiliary information.

Specifically, the cell selection auxiliary information includes one type or any combination of the following content:
    if the terminal has no cell-specific reference signal CRS interference suppression capability or interference cancellation capability, a carrier that is configured to be used to avoid interference to a neighboring cell is used as a high-priority cell selection or reselection target or a preferred resident carrier; and
    if the terminal has the CRS interference suppression capability or interference cancellation capability, the carrier that is configured to be used to avoid interference to a neighboring cell is used as a low-priority cell selection or reselection target or a non-preferred resident carrier.

Correspondingly, the processor 51 may be specifically configured to:
    if the terminal has no CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a high-priority cell selection or reselection target or a preferred resident carrier; or
    if the terminal has no CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a high-priority cell selection or reselection target or a preferred resident carrier; or
    if the terminal has the CRS interference suppression capability or interference cancellation capability, the candidate target set determined by the terminal includes multiple carriers configured on an interfered base station, the multiple carriers have a highest priority, and a first carrier in the multiple carriers is configured by an interfering base station as a carrier used to avoid interference to a neighboring cell, use the first carrier, configured on the interfered base station, as a low-priority cell selection or reselection target or a non-preferred resident carrier; or
    if the terminal has the CRS interference suppression capability or interference cancellation capability, the candidate target set determined by the terminal includes a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations, use the carrier, configured by the interfered base station, as a low-priority cell selection or reselection target or a non-preferred resident carrier.

Further, the processor 51 may be further configured to:
    if the terminal has no CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a high-priority cell selection or reselection target or a preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations; or
    if the terminal has the CRS interference suppression capability or interference cancellation capability, the candidate target set determined by the terminal includes N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations, use a second carrier, configured by the interfered base station, as a low-priority cell selection or reselection target or a non-preferred resident carrier, where the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

Specifically, the cell selection auxiliary information includes one type or a combination of the following information: carrier configuration characteristic information, a carrier with a specified characteristic, and resident carrier preference information of the terminal.

Specifically, the processor 51 may receive a broadcast message or dedicated signaling by using the transceiver 53, and receive the cell selection auxiliary information from a base station by using the broadcast message or the dedicated signaling.

It should be noted that, reference may be made to description in the foregoing embodiments for another function implemented by the various components of the terminal in addition to the above-mentioned functions of the components of the terminal. In addition, for content, a meaning, or an expression form of related information, reference may also be made to the description in the foregoing embodiments, and details are not repeatedly described herein.

In addition, a computer readable media (or medium) is further provided, including a computer readable instruction used to perform the following operations when executed: performing operations of 101 and 102, 201 and 202, or 301 to 303 in the methods of the foregoing embodiments.

In addition, a computer program product is further provided, including the foregoing computer readable medium.

It should be noted that signaling mentioned in this specification includes but is not limited to an instruction, information, a signal, a message, or the like, and this is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device may implement a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A cell selection method, comprising:
    performing, by a terminal, cell measurement;
    obtaining from a base station, by the terminal, cell selection auxiliary information comprising carrier configuration characteristic information; and
    performing, by the terminal, cell selection according to a cell measurement result and the cell selection auxiliary information;
    wherein:
    the carrier configuration characteristic information comprising:
        a carrier identifier and indication information corresponding to the carrier identifier, wherein the indication information is used to indicate whether a corresponding carrier is configured as a carrier used to avoid interference to a neighboring cell;
        the carrier used to avoid interference to a neighboring cell comprises an extension carrier with a null subframe without a cell-specific reference signal (CRS) for an aggressor cell, which forms complete protection on a victim terminal in a victim cell, wherein the aggressor cell is an interfering cell and the victim cell is an interfered cell.

2. The method according to claim 1, wherein the performing, by the terminal, cell selection according to a cell measurement result and the cell selection auxiliary information comprises:
    determining, by the terminal, a candidate target set for the cell selection according to the cell measurement result, wherein the candidate target set comprises a candidate target cell or a candidate target base station; and
    selecting, by the terminal, a cell from the candidate target set according to the cell selection auxiliary information.

3. The method according to claim 1, wherein the cell selection auxiliary information comprises one type or any combination of the following content:
    a carrier that is configured to be used to avoid interference to a neighboring cell is used as a high-priority cell selection target or a preferred resident carrier when the terminal has no cell-specific reference signal CRS interference suppression capability or interference cancellation capability; and
    the carrier that is configured to be used to avoid interference to a neighboring cell is used as a low-priority cell selection target or a non-preferred resident carrier when the terminal has the CRS interference suppression capability or interference cancellation capability.

4. The method according to claim 3, wherein the selecting, by the terminal, a cell from the candidate target set according to the cell selection auxiliary information comprises:
    using a first carrier, configured on an interfered base station, as a high-priority cell selection target or a preferred resident carrier when the terminal has no CRS interference suppression capability or interference cancellation capability, the candidate target set determined by the terminal comprises multiple carriers configured on the interfered base station, the multiple carriers have a highest priority, and the first carrier in the multiple carriers is configured by an interfering base station as a carrier used to avoid interference to a neighboring cell.

5. The method according to claim 3, wherein the selecting, by the terminal, a cell from the candidate target set according to the cell selection auxiliary information comprises:
    using the carrier, configured by an interfered base station, as a high-priority cell selection target or a preferred resident carrier when the terminal has no CRS interference suppression capability or interference cancellation capability, the candidate target set determined by the terminal comprises a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations.

6. The method according to claim 3, wherein the selecting, by the terminal, a cell from the candidate target set according to the cell selection auxiliary information comprises:
    using a first carrier, configured on an interfered base station, as a low-priority cell selection target or a non-preferred resident carrier when the terminal has the CRS interference suppression capability or interference cancellation capability, the candidate target set determined by the terminal comprises multiple carriers configured on the interfered base station, the multiple carriers have a highest priority, and the first carrier in the multiple carriers is configured by an interfering base station as a carrier used to avoid interference to a neighboring cell.

7. The method according to claim 3, wherein the selecting, by the terminal, a cell from the candidate target set according to the cell selection auxiliary information comprises:

using the carrier, configured by an interfered base station, as a low-priority cell selection target or a non-preferred resident carrier when the terminal has the CRS interference suppression capability or interference cancellation capability, the candidate target set determined by the terminal comprises a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations.

8. The method according to claim 1, further comprising: using a second carrier, configured by an interfered base station, as a high-priority cell selection target or a preferred resident carrier, wherein the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations.

9. The method according to claim 1, further comprising: using a second carrier, configured by an interfered base station, as a low-priority cell selection target or a non-preferred resident carrier, wherein the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations when the terminal has the CRS interference suppression capability or interference cancellation capability, the candidate target set determined by the terminal comprises N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations.

10. The method according to claim 1, wherein the cell selection auxiliary information further comprises one type or a combination of the following information:
a carrier with a specified characteristic; and
resident carrier preference information of the terminal.

11. The method according to claim 10, wherein the resident carrier preference information of the terminal comprises:
an identifier of a carrier that is configured to be used to avoid interference to a neighboring cell and a list of a first terminal type and a list of a second terminal type that is corresponding to the identifier of the carrier, wherein
a terminal indicated by the first terminal type has no CRS interference suppression capability or interference cancellation capability, and uses a carrier that is configured to be used to avoid interference to a neighboring cell as a high-priority cell selection target; and
a terminal indicated by the second terminal type has the CRS interference suppression capability or interference cancellation capability, and uses a carrier that is configured to be used to avoid interference to a neighboring cell as a low-priority cell selection target.

12. A terminal, comprising:
a processor;
a memory;
a transceiver; and
a bus interface, wherein the processor, the memory, and the transceiver are connected by using the bus interface, the memory stores data used when the processor performs an operation, the transceiver is configured to receive and transmit data under control of the processor, and
the processor is configured to read a program in the memory, to execute the following process:
performing cell measurement;
obtaining from a base station cell selection auxiliary information comprising carrier configuration characteristic information; and
performing cell selection according to a cell measurement result and the cell selection auxiliary information;
wherein:
the carrier configuration characteristic information comprising:
a carrier identifier and indication information corresponding to the carrier identifier, wherein the indication information is used to indicate whether a corresponding carrier is configured as a carrier used to avoid interference to a neighboring cell;
the carrier used to avoid interference to a neighboring cell comprises an extension carrier with a null subframe without a cell-specific reference signal (CRS) for an aggressor cell, which forms complete protection on a victim terminal in a victim cell, wherein the aggressor cell is an interfering cell and the victim cell is an interfered cell.

13. The terminal according to claim 12, wherein the processor is specifically configured to:
determine a candidate target set for the cell selection according to the cell measurement result, wherein the candidate target set comprises a candidate target cell or a candidate target base station; and
select a cell from the candidate target set according to the cell selection auxiliary information.

14. The terminal according to claim 12, wherein the cell selection auxiliary information comprises one type or any combination of the following content:
a carrier that is configured to be used to avoid interference to a neighboring cell is used as a high-priority cell selection target or a preferred resident carrier when the terminal has no cell-specific reference signal CRS interference suppression capability or interference cancellation capability; and
the carrier that is configured to be used to avoid interference to a neighboring cell is used as a low-priority cell selection target or a non-preferred resident carrier when the terminal has one of the CRS interference suppression capability and interference cancellation capability.

15. The terminal according to claim 14, wherein the processor is configured to:
use the first carrier, configured on the interfered base station, as a high-priority cell selection target or a preferred resident carrier when the terminal has no CRS interference suppression capability or interference cancellation capability, the candidate target set determined by the terminal comprises multiple carriers configured on an interfered base station, the multiple carriers have a highest priority, and a first carrier in the multiple carriers is configured by an interfering base station as a carrier used to avoid interference to a neighboring cell.

16. The terminal according to claim 14, wherein the processor is configured to:

use the carrier, configured by the interfered base station, as a high-priority cell selection or target or a preferred resident carrier when the terminal has no CRS interference suppression capability or interference cancellation capability, the candidate target set determined by the terminal comprises a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations.

17. The terminal according to claim 14, wherein the processor is configured to:

use the first carrier, configured on the interfered base station, as a low-priority cell selection target or a non-preferred resident carrier when the terminal has the CRS interference suppression capability or interference cancellation capability, the candidate target set determined by the terminal comprises multiple carriers configured on an interfered base station, the multiple carriers have a highest priority, and a first carrier in the multiple carriers is configured by an interfering base station as a carrier used to avoid interference to a neighboring cell.

18. The terminal according to claim 14, wherein the processor is configured to:

use the carrier, configured by the interfered base station, as a low-priority cell selection target or a non-preferred resident carrier when the terminal has the CRS interference suppression capability or interference cancellation capability, the candidate target set determined by the terminal comprises a carrier configured on multiple mutually interfering base stations, and the carrier is configured by one or more interfering base stations in the multiple mutually interfering base stations as a carrier used to avoid interference to one or more interfered neighboring cells of the multiple mutually interfering base stations.

19. The terminal according to claim 12, wherein the processor is further configured to:

use a second carrier, configured by the interfered base station, as a high-priority cell selection target or a preferred resident carrier, wherein the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations when the terminal has no CRS interference suppression capability or interference cancellation capability, the candidate target set determined by the terminal comprises N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations.

20. The terminal according to claim 12, wherein the processor is further configured to:

use a second carrier, configured by the interfered base station, as a low-priority cell selection target or a non-preferred resident carrier, wherein the second carrier is one of the N carriers, and a quantity of interfering base stations that configure the second carrier as a carrier used to avoid interference to one or more interfered neighboring cells of the multiple mutually interfering base stations is greater than a quantity of interfering base stations that configure another carrier in the N carriers as a carrier used to avoid interference to one or more interfered neighboring cells of the multiple mutually interfering base stations when the terminal has the CRS interference suppression capability or interference cancellation capability, the candidate target set determined by the terminal comprises N carriers configured on multiple mutually interfering base stations, N is an integer greater than 1, and the N carriers are configured by one or more interfering base stations in the multiple mutually interfering base stations as carriers used to avoid interference to one or more interfered neighboring cells of the multiple mutually interfering base stations.

* * * * *